United States Patent
Hoy et al.

(10) Patent No.: US 12,241,969 B2
(45) Date of Patent: Mar. 4, 2025

(54) SYSTEM AND METHOD FOR SUPPORT STRUCTURE DETECTION

(71) Applicant: ZEBRA TECHNOLOGIES CORPORATION, Lincolnshire, IL (US)

(72) Inventors: Aaron Hoy, San Jose, CA (US); Derek King, Seattle, WA (US); Steffen Fuchs, San Jose, CA (US); Vishnu Sudheer Menon, Sunnyvale, CA (US); David Dymesich, New York, NY (US); Robert Isaiah Chatman, III, Campbell, CA (US); Jenna Guergah, Santa Cruz, CA (US); Brian Richard Cairi, Huntington, NY (US); Melonee Wise, San Jose, CA (US); Alison Cheng, Santa Clara, CA (US); Katrin Beauchaud, Sunnyvale, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 292 days.

(21) Appl. No.: 17/985,681

(22) Filed: Nov. 11, 2022

(65) Prior Publication Data
US 2023/0375697 A1 Nov. 23, 2023

Related U.S. Application Data

(60) Provisional application No. 63/344,335, filed on May 20, 2022.

(51) Int. Cl.
*G01S 13/89* (2006.01)
*G05D 1/00* (2006.01)

(52) U.S. Cl.
CPC ............ *G01S 13/89* (2013.01); *G05D 1/0212* (2013.01); *G05D 1/0274* (2013.01)

(58) Field of Classification Search
CPC ..... G01S 13/89; G05D 1/0212; G05D 1/0274
USPC .......................................................... 701/24
See application file for complete search history.

(56) References Cited

U.S. PATENT DOCUMENTS

| | | | | |
|---|---|---|---|---|
| 10,731,970 B2 * | 8/2020 | Cao | ........................ | G06V 20/56 |
| 11,158,075 B2 * | 10/2021 | Ben-Lavi | ............... | G06V 20/52 |
| 11,392,891 B2 * | 7/2022 | Stagg | ................. | G06Q 30/0201 |
| 11,958,688 B2 * | 4/2024 | Cesic | ..................... | G05D 1/226 |
| 12,045,951 B2 * | 7/2024 | Hutchcroft | ............. | G06V 10/26 |
| 2024/0127535 A1 * | 4/2024 | Lin | ........................... | G06T 7/20 |

* cited by examiner

Primary Examiner — Andrew Joseph Rudy

(57) ABSTRACT

A method includes: capturing, via a navigational sensor of a mobile automation apparatus, three-dimensional point cloud data depicting a portion of an aisle containing a support structure, the support structure having a forward plane facing into the aisle; generating, from the point cloud data, a two-dimensional projection in a facility coordinate system; retrieving, from a stored map, an expected location of the forward plane of the support structure in the facility coordinate system; selecting, from the projection, a subset of regions satisfying a positional criterion relative to the location of the forward plane; determining, based on the selected subset of regions from the projection, an actual location of the forward plane of the support structure in the facility coordinate system; and providing the actual location of the forward plane to a navigational controller of the mobile automation apparatus.

22 Claims, 9 Drawing Sheets

SYSTEM AND METHOD FOR SUPPORT STRUCTURE DETECTION

CROSS-REFERENCE TO RELATED APPLICATIONS

This application claims priority to U.S. Provisional Patent Application No. 63/344,335, filed May 20, 2022, the entire contents of which is incorporated herein by reference.

BACKGROUND

Autonomous or semi-autonomous transporters, e.g., deployed in facilities to transport items such as parcels and the like, can implement navigational functions including pose tracking according to a coordinate system defined in the facility. Localization errors by the transporters, however, can lead to suboptimal navigation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
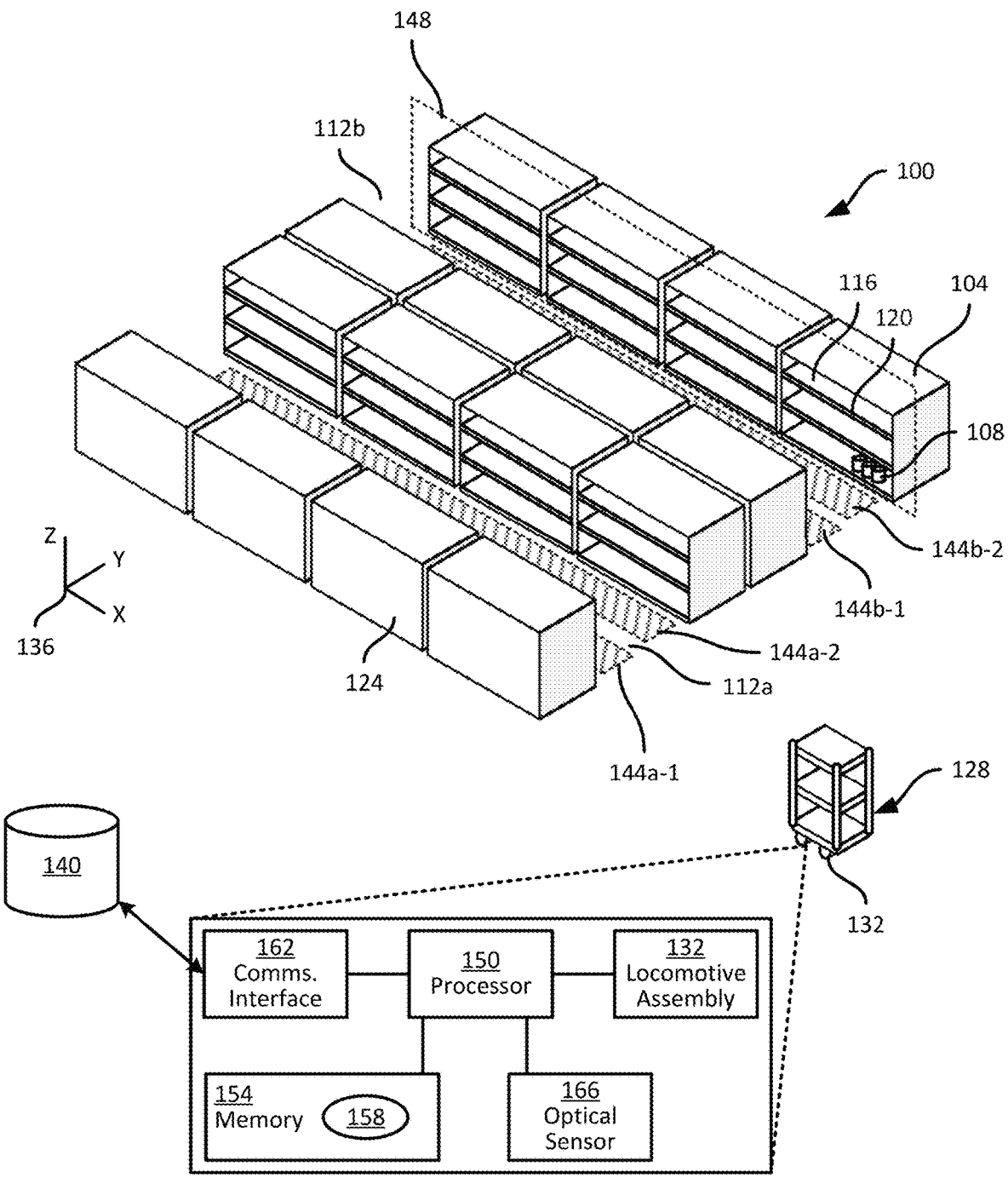
FIG. 1 is a diagram of an item handling system deployed in a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method including: capturing, via a sensor of a mobile automation apparatus, three-dimensional point cloud data depicting a portion of an aisle containing a support structure, the support structure having a forward plane facing into the aisle; generating, from the point cloud data, a two-dimensional projection in a facility coordinate system; retrieving, from a stored map, an expected location of the forward plane of the support structure in the facility coordinate system; selecting, from the projection, a subset of regions satisfying a positional criterion relative to the location of the forward plane; determining, based on the selected subset of regions from the projection, an actual location of the forward plane of the support structure in the facility coordinate system; and providing the actual location of the forward plane to a navigational controller of the mobile automation apparatus.

Additional examples disclosed herein are directed to a computing device, including: an optical sensor; a processor configured to: capture, via the sensor, three-dimensional point cloud data depicting a portion of an aisle containing a support structure, the support structure having a forward plane facing into the aisle; generate, from the point cloud data, a two-dimensional projection in a facility coordinate system; retrieve, from a stored map, an expected location of the forward plane of the support structure in the facility coordinate system; select, from the projection, a subset of regions satisfying a positional criterion relative to the location of the forward plane; determine, based on the selected subset of regions from the projection, an actual location of the forward plane of the support structure in the facility coordinate system; and provide the actual location of the forward plane to a navigational controller of a mobile automation apparatus.

FIG. 1 illustrates a system 100 deployed in an interior of a facility, such as a warehouse, a manufacturing facility, or the like. The facility includes a plurality of support structures 104 carrying items 108. In the illustrated example, the support structures 104 include shelf modules, e.g., arranged in sets forming aisles 112a and 112b (collectively referred to as aisles 112, and generically referred to as an aisle 112. In other examples, the facility can include fewer aisles 112 than shown, or more aisles than shown in FIG. 1. The aisle 112, in the illustrated example, are formed by sets of eight support structures 104 (four on each side). The facility can also have a wide variety of other aisle layouts, however. As will be apparent, each aisle 112 is a space open at the ends, and bounded on either side by a support structure 104. The aisle 112 can be travelled by humans, apparatuses, and the like.

The support structures 104 can include shelf modules, pegboards, bins, and the like, to support the items 108 thereon. As shown in FIG. 1, support structures 104 in the form of shelf modules include support surfaces 116 (supporting the items 108) terminating in shelf edges 120, which face into the corresponding aisle 112. A shelf edge 120 is a surface bounded by adjacent surfaces having different angles of inclination. In the example illustrated in FIG. 1, each shelf edge 120 is at an angle of about ninety degrees relative to the corresponding support surface 116 above that shelf edge 120 and the underside (not shown) of the support surface 116. In other examples, the angles between a shelf edge 120 and adjacent surfaces is more or less than ninety degrees.

The support surfaces 116 are accessible from the aisles 112 into which the shelf edges 120 face. In some examples, each support structure 104 has a back wall 124 rendering the support surfaces 116 inaccessible from the opposite side of the module. In other examples, however, the support structures 104 can be open from both sides (e.g., the back wall 124 can be omitted).

The items 108 may be handled according to a wide variety of processes, depending on the nature of the facility. In some examples, the facility is a shipping facility, distribution facility, or the like, and the items 108 can be placed on the support structures 104 for storage, and subsequently retrieved for shipping from the facility. Placement and/or retrieval of the items 108 to and/or from the support structures can be performed or assisted by autonomous or semi-autonomous transporters 128, which may also be referred to as mobile automation apparatuses 128.

FIG. 1 illustrates one example transporter 128, although it will be understood that greater numbers of transporters 130 can be employed in other implementations, for example based on the size and/or layout of the facility. The transporter 128 includes a movable chassis, e.g., with a locomotive assembly 132 such as wheels, tracks or the like driven by an electric motor. The chassis supports one or more bins, shelves or the like, configured to hold items 108. To travel the aisles 112 and deposit or collect items, the transporter 128 implements navigational functionality to autonomously or semi-autonomously travel within the facility to locations (e.g., provided to the transporter 128 by a server, human operator, or the like).

To navigate the facility, the transporter 128 is configured to track its pose, e.g., as a current location and a current orientation of the transporter 128, relative to a facility coordinate system 136. In the illustrated example, the XY plane of the coordinate system 136 is coplanar with a floor of the facility, on which the transporter 128 travels. The transporter 128 can track its pose via sensor data, e.g., captured by a motion sensor such as an odometer integrated with the locomotive assembly 132, and/or captured by other sensors such as cameras, lidars, or the like. The transporter 128 can also employ a map of the facility, e.g., stored in a repository 140 stored by the transporter 128, or accessible to the transporter 128 via a network. The map contains data defining the positions of various structures within the facility, including the support structures 104. The current pose of the transporter 128, as well as the map, can be used to plan paths through the facility, e.g., towards target locations the transporter 128 is instructed to travel to.

While travelling within the aisles 112, the transporter 128 can be configured to travel along predefined virtual lanes. In the illustrated example, two lanes 144a-1 and 144a-2 are defined within the aisle 112a, and two lanes 144b-1 and 144b-2 are defined within the aisle 112b. Travelling along the lanes 144 can facilitate the use of an aisle 112 by distinct transporters 128, e.g., travelling in opposite directions along the same aisle 112. The lanes 144, however, are virtual and therefore do not include physical components detectable from the sensor data employed by the transporter 128 to navigate. Localization errors at the transporter 128 (e.g., in which the sensed pose of the transporter 128 is different from the true pose of the transporter 128) may therefore lead to travel outside a lane 144.

To augment localization of the transporter 128 during travel within the aisles 112, and mitigate travel outside the lanes 144 due to localization error, the transporter 128 implements functionality to detect a forward plane 148 of at least one support structure 104 within the aisle 112 in which the transporter 128 is travelling. The transporter 128 can then, for example, navigate along a lane 144 by maintaining a predetermined distance from the forward plane 148, and/or by providing the position of the forward plane 148 as a further input to the localization mechanisms employed to determine the current pose of the transporter 128 in the coordinate system 136.

Although the support structures 104 are indicated in the map, the detection of a forward plane 148 of a support structure from sensor data collected by the transporter 128 may be complicated by the items 108 and/or other objects in the vicinity of the support structures 104. The number, size, and arrangement of items 108 on the support structures 104 can vary widely, and some items 108 may protrude beyond the edges 120 into the aisle, while others may be set back from the edges 120 on the support surfaces 116. The above conditions may interfere with accurate detection of the forward plane 148 from data captured by the sensors of the transporter 128. The transporter 128 is therefore configured to perform certain functionality, discussed below, to detect the forward plane 148 of a support structure 104 in an aisle the transporter 128 is travelling, and to employ the detected forward plane 148 to navigate the aisle 112 (e.g., to remain in a lane 144).

Certain internal components of the transporter 128 are also illustrated in FIG. 1. In addition to the locomotive assembly 132 mentioned above, the transporter 128 includes a processor 150, such as a central processing unit (CPU), graphics processing unit (GPU), or other suitable processing circuitry (e.g., an application specific integrated circuit, or ASIC). The processor 150 is coupled with a non-transitory computer readable medium, such as a memory 154 (e.g., a suitable combination of volatile and non-volatile memory elements). The memory 154 stores computer readable instructions executable by the processor 150, such as an application 158 executable to detect the forward planes 148 as mentioned above. In other examples, the application 158 can be implemented as a suite of distinct applications.

The transporter 128 also includes a communication interface 162 (e.g., a Wi-Fi interfaces or the like) permitting communication with other computing devices, such as a server configured to provide instructions (e.g., target locations within the facility) to the transporter 128, and/or a computing device hosting the repository 140. The transporter 128 further includes an optical sensor 166, such as a depth camera, time of flight (ToF) camera, laser scanner (e.g., a lidar sensor), or combination thereof. The optical sensor 166 is controllable by the processor 150 to capture data representing the vicinity of the transporter 128, e.g., as a point cloud. The captured point cloud is then processed, e.g., via execution of the application 158, to detect forward planes 148 of support structures 104.

Figure 2:
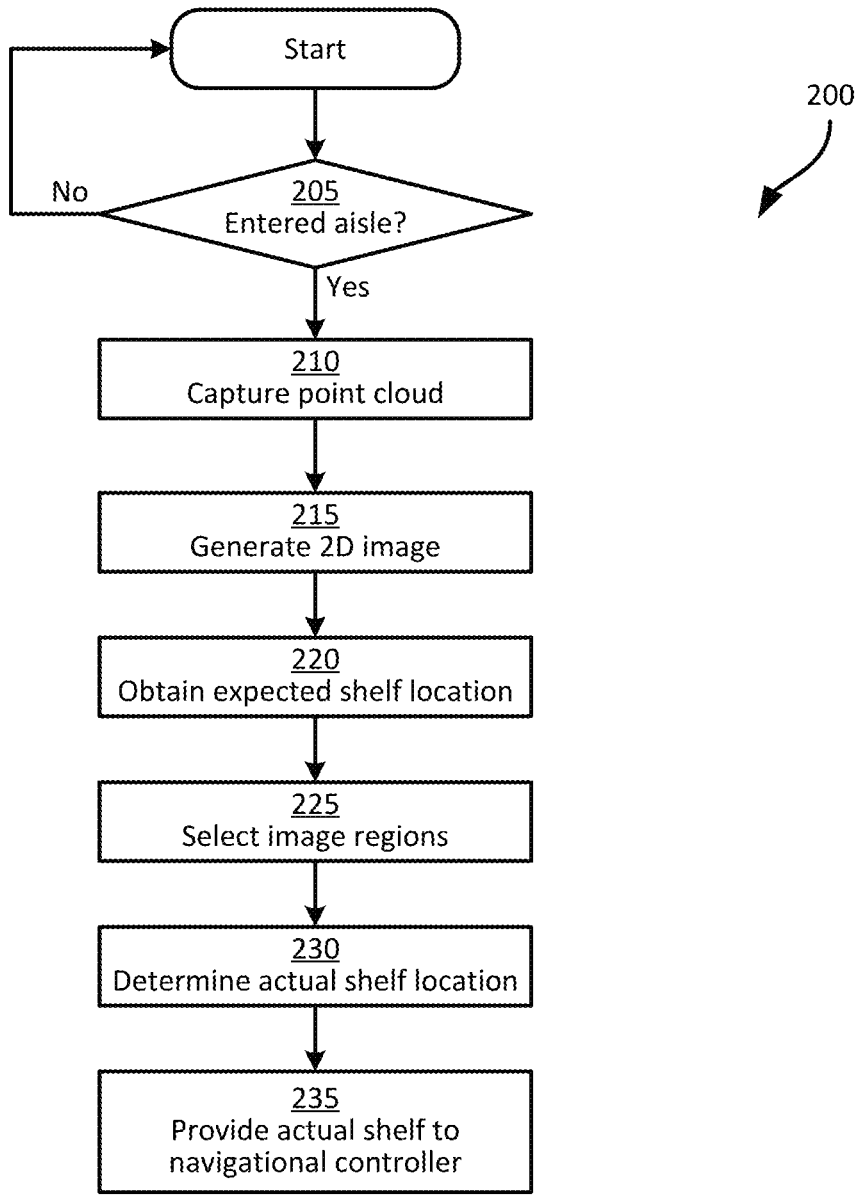
FIG. 2 is a flowchart illustrating a method of support structure detection.

Turning to FIG. 2, a method 200 of support structure detection is illustrated. The method 200 is described below in conjunction with its example performance by the transporter 128, e.g., via execution of the application 158 by the processor 150. In other examples, the method 200 can be performed at least in part by a computing device distinct from the transporter 128, such as the above-mentioned server.

Figure 3:
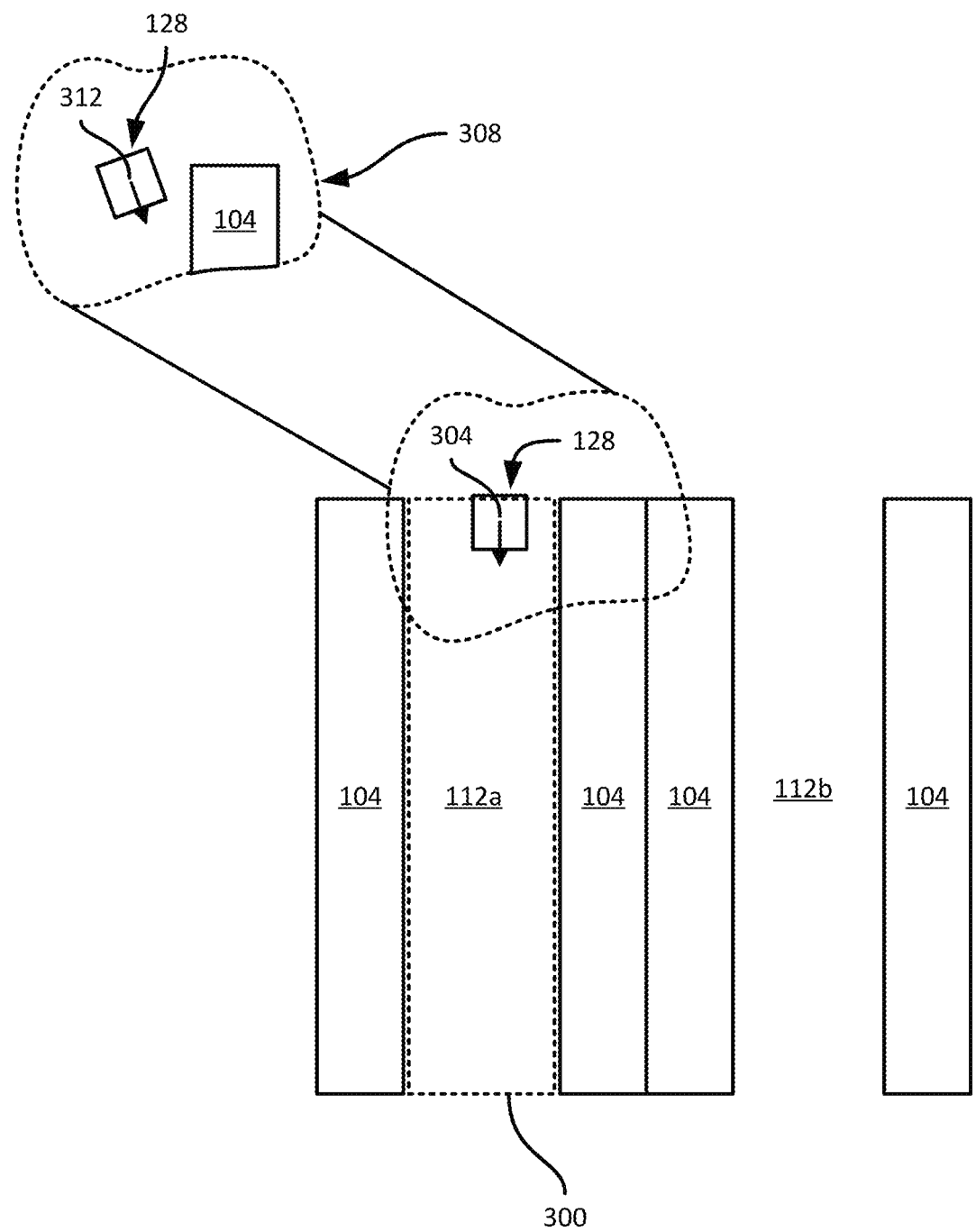
FIG. 3 is a diagram illustrating an example performance of block 205 of the method of FIG. 2.

At block 205, the processor 150 is configured to determine whether the transporter 128 has entered an aisle 112. The determination can include comparing a current pose of the transporter 128 to a region in the map encompassing the nearest aisle 112, and determining whether the current pose is within the region. Turning briefly to FIG. 3, an overhead view of the facility is shown, with the transporter 128 at a current pose 304, with the arrow indicating an orientation, e.g., the direction of travel, of the transporter 128, and the base of the arrow indicating the current location of the transporter 128. As shown in FIG. 3, the current pose 304 is within a region 300 corresponding to the aisle 112a, and the determination at block 205 is therefore affirmative. When the determination at block 205 is negative, the transporter 128 can repeat the determination, without initiating detection of support structure forward planes 148. Attempted detection of forward planes 148 when the transporter 128 is not located within an aisle 112 may lead to false positive detections of forward planes 148 (e.g., from objects that are not support structures 104). The performance of block 205 reduces the likelihood of false positive detections of forward planes 148. The current pose 304 shown in FIG. 3 is the pose determined by the transporter 128. FIG. 3 also shows, in the inset 308, the actual pose 312 of the transporter 128. The actual pose 312 indicates that the transporter 128 has incorrectly detected its orientation.

At block 210, following an affirmative determination at block 205, the transporter 128 is configured to capture a point cloud, such as one or more image frames from a depth camera, lidar, or the like. Since the transporter 128 is within an aisle 112 when block 210 is performed, the captured point cloud depicts a portion of an aisle 112, and in particular depicts at least a portion of a support structure 104 and/or items 108 thereon. The captured data can be preprocessed to remove certain features therefrom, such as the floor (e.g., by filtering out any points with a value in the Z axis of the coordinate system 136 below a predetermined threshold (e.g., 5 cm or the like), and/or by filtering out any points at a greater distance than another threshold (e.g., 5 m or the like). The point cloud includes a plurality of points, each having coordinates (e.g., X, Y, and Z values) in the facility coordinate system 136. The transporter 128 can be configured to assign such coordinates to each point by transforming captured coordinates of each point from a transporter frame of reference (e.g., centered on the sensor 166) to the coordinate system 136, using the current pose 304 of the transporter 128. As will therefore be apparent, the coordinates assigned to each point in the captured point cloud may include positional errors as a result of mis-localization of the transporter 128.

At block 215, the transporter 128 is configured to generate, from the point cloud captured at block 210, a two-dimensional (2D) image registered to the coordinate system 136, and oriented perpendicularly to the forward planes 148. In this example, the forward planes 148 are substantially vertical, and the two-dimensional image generated at block 215 is therefore substantially horizontal, e.g., parallel to a floor of the facility. In other words, the 2D image can be co-planar with the XY plane of the coordinate system 136.

Various mechanisms are contemplated for generating the 2D image at block 215. For example, turning to FIG. 4, an example point cloud 400 is illustrated, depicting items 108-1, 108-2, and 108-3 on a support structure (e.g., on the lower support surface 116 of the support structure 104). As seen in the point cloud 400, the items 108-1 and 108-3 protrude over the edge 120, while in other areas the support surface 116 is visible.

In some examples, the transporter 128 can generate a 2D image 404 at block 215, by projecting each point in the point cloud 400 onto the XY plane of the coordinate system 136 (e.g., by discarding the Z coordinate of each point). The transporter 128 may also downsample the point cloud, e.g., discarding a portion of the points therein to reduce the computational load associated with processing the 2D image 404. The image 404 includes a plurality of pixels 408 (the size of each pixel 408 is exaggerated in FIG. 4 for illustrative purposes, and the number of pixels 408 is also reduced for visibility). As will be apparent, a region 412 of the image 404 corresponds to the forward face of the item 108-2, while a region 416 of the image 404 corresponds to the forward face of the item 108-3.

Figure 4:
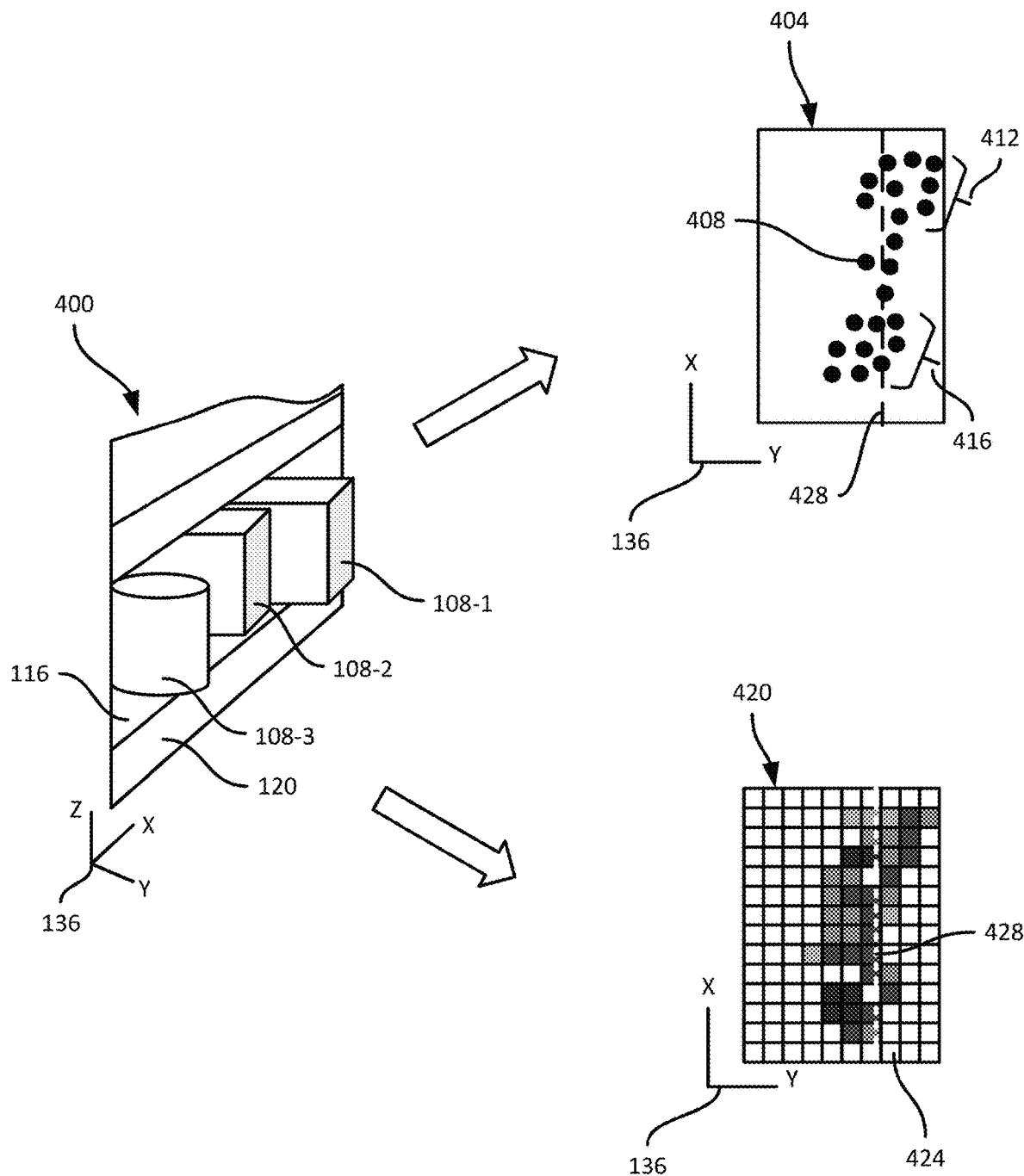
FIG. 4 is a diagram illustrating an example performance of blocks 210 and 215 of the method of FIG. 2.

In other examples, the transporter 128 can generate a 2D image at block 215 in the form of a histogram 420. The histogram 420 includes a two-dimensional grid of cells 424, with predetermined dimensions (e.g., to provide the histogram 420 with greater resolution, at greater computational cost, or lower resolution, at lower computational cost). The transporter 128 can be configured to project the points of the point cloud 400 onto the XY plane as discussed in connection with the image 404, and to assign a value to each cell 424 according to the number of points contained within that cell. The values are represented in FIG. 4 as intensity values, e.g., with darker cells indicating a greater number of pixels. In some examples, the transporter 128 can also binarize the histogram 420 before further processing, e.g., by setting each cell 424 to a maximal intensity value if the original value of the cell is above a threshold, or otherwise setting the value of the cell 424 to a minimal value. Further, the transporter 128 can apply a morphological operation, or combination thereof (e.g., erosion and/or dilation) to fill holes in the histogram 420 (e.g., setting low-value cells indicating empty space to full, if such cells are substantially surrounded by high-value cells indicating occupied space).

Returning to FIG. 2, at block 220 the transporter 128 is configured to obtain an expected location of the forward plane 148 of the support structure 104 depicted in the point cloud 400 and the resulting 2D image (e.g., the image 404 or the histogram 420). The expected location is retrieved from the map, e.g., in the repository 140, based on the current pose of the transporter 128. That is, the transporter 128 retrieves (e.g., from the repository 140) the location of the forward plane 148 corresponding to the support structure 104 depicted in the point cloud 400, and overlays the location of the forward plane 148 with the 2D image generated at block 210. FIG. 4 illustrates an example expected forward plane location, e.g., as a line 428 overlaid on the image 404 and the histogram 420. As seen in FIG. 4, the expected location 428 of the forward plane 148 is misaligned relative to the image data, e.g., because of errors in the localization of the transporter 128. For example, the transporter 128 may on occasion determine a current pose that deviates from the true pose of the transporter 128. Because the expected location 428 is placed in the image data according to the current pose of the transporter 128, the expected location 428 may therefore inherit localization errors of the transporter 128.

To detect the actual location of the forward plane 148 (and thereby correct localization errors at the transporter 128), at block 225 the transporter 128 is configured to select certain regions of the image data generated at block 215 that satisfy a positional criterion, and to process the selected regions to detect the actual location of the forward plane 148 at block 230. The nature of the selection at block 225 and the determination at block 230 can vary, e.g., according to the nature of the 2D image generated at block 215.

Figure 5:
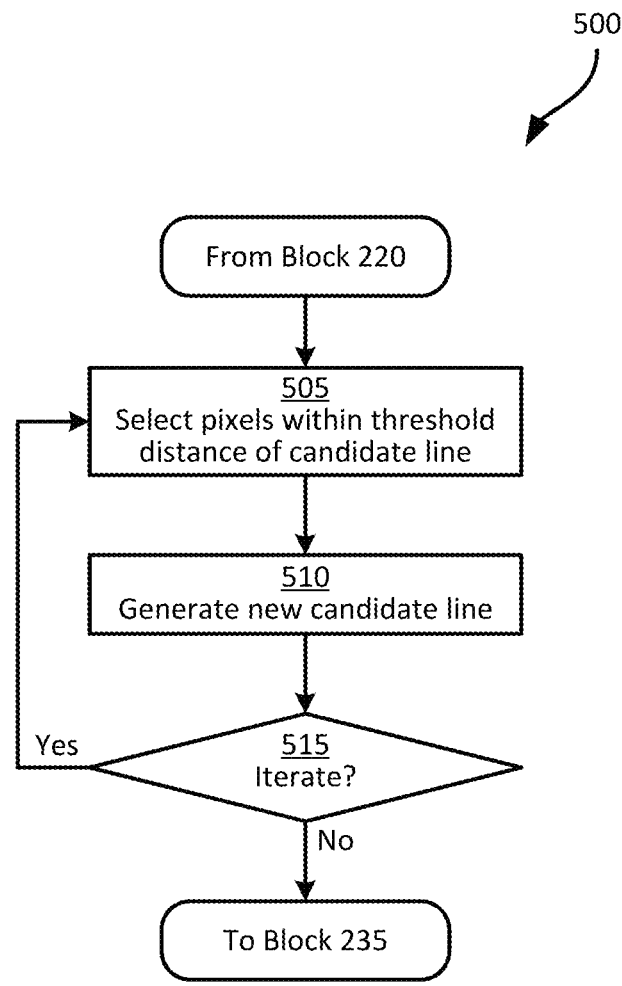
FIG. 5 is a flowchart illustrating a method of performing blocks 225 and 230 of the method of FIG. 2.

Turning to FIG. 5, a method 500 of performing blocks 225 and 230 of the method 200 according to an example implementation is illustrated. The method 500 can be performed by the transporter 128, for example, when the 2D image generated at block 215 is the image 404 as discussed above. At block 505, the transporter 128 is configured to select pixels of the image 404 within a first threshold distance of a candidate forward plane location. Initially, the candidate forward plane location is the expected location retrieved at block 220.

At block 510, the transporter 128 is configured to generate a new candidate line from the pixels selected at block 505, e.g., via linear regression or another suitable line fitting operation (e.g., random sample concensus, or RANSAC). At block 515, the transporter 128 is configured to determine whether to perform another iteration of blocks 505 and 510. The determination at block 515 can be based on whether a predetermined number of iterations is to be performed, and/or on whether a score determined for the candidate generated at block 510 (e.g., a count of points within a threshold distance of the candidate line) exceeds a score threshold. In some examples, the threshold mentioned above can be reduced for subsequent iterations.

Figure 6:
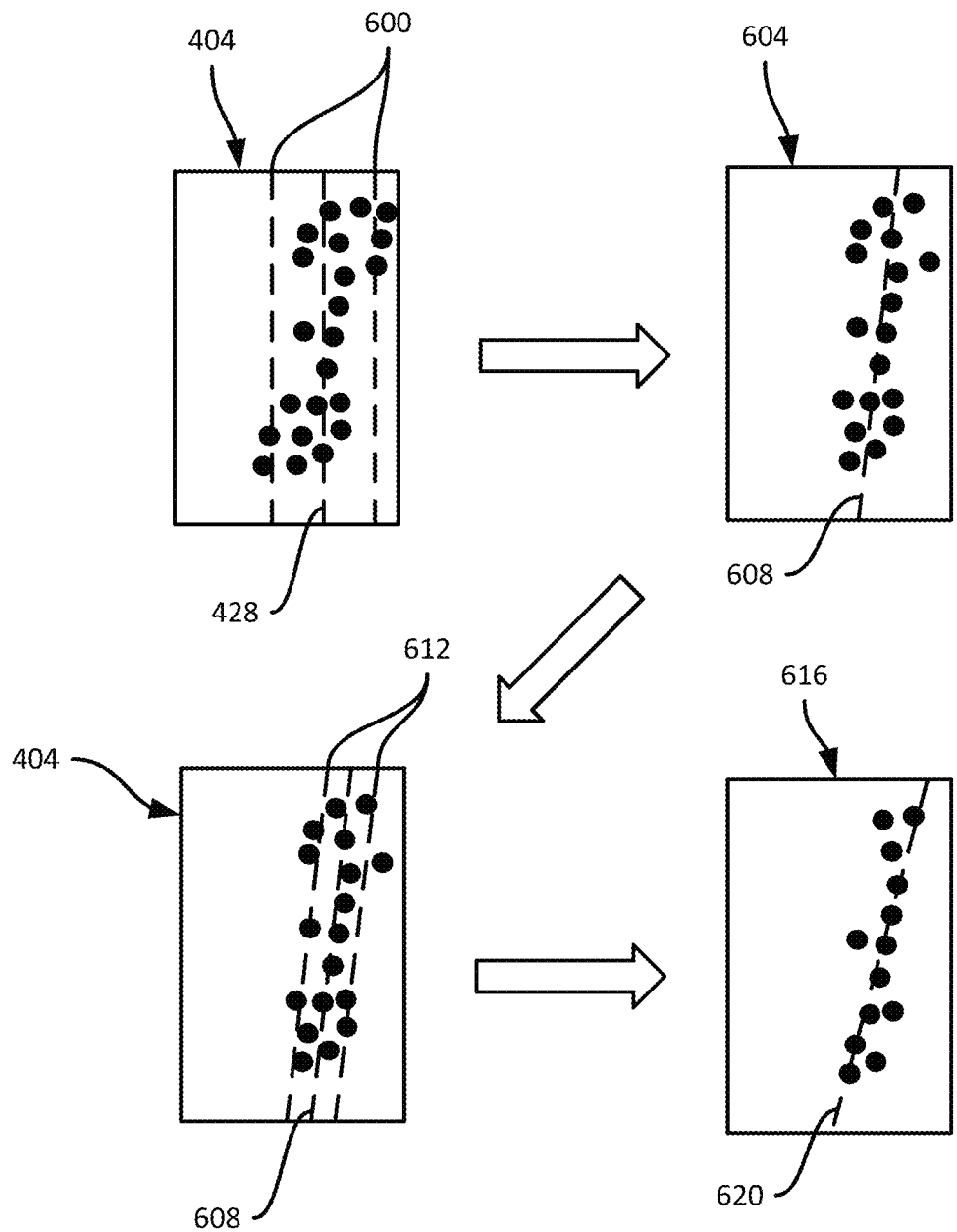
FIG. 6 is a diagram illustrating an example performance of the method of FIG. 5.

FIG. 6 illustrates an example performance of the method 500, starting with the image 404 and the expected forward plane location 428. At block 505, the transporter 128 is configured to select any pixels within a first threshold distance of the expected location 428, e.g., as indicated by the selection boundaries 600. From the selected subset 604 of pixels, the transporter 128 is then configured (at block 510), to fit a new candidate location, e.g., as a line 608. As seen from FIG. 6, the line 608 is a closer fit to the forward plane 128 than the line 428, as a result of excluding certain points corresponding to the items 108-1.

When the determination at block 515 is affirmative, the transporter 128 can be configured to select a further subset of pixels from the image 404, e.g., within a second threshold of the candidate line 608, indicated by the selection boundary 612. As seen in FIG. 6, the selection boundary 612 is defined by a smaller distance threshold than the selection boundary 600. From the selected subset, the transporter 128 is then configured, at block 510, to generate an updated candidate line 620. As will be apparent, the candidates 608 and 620 are progressively angled away from the initially expected location 428 of the forward plane 148, and reflect the orientation error in the current pose of the transporter 128 shown in FIG. 3.

Following a negative determination at block 515, the transporter 128 returns to block 235 of the method 200, discussed below.

Figure 7:
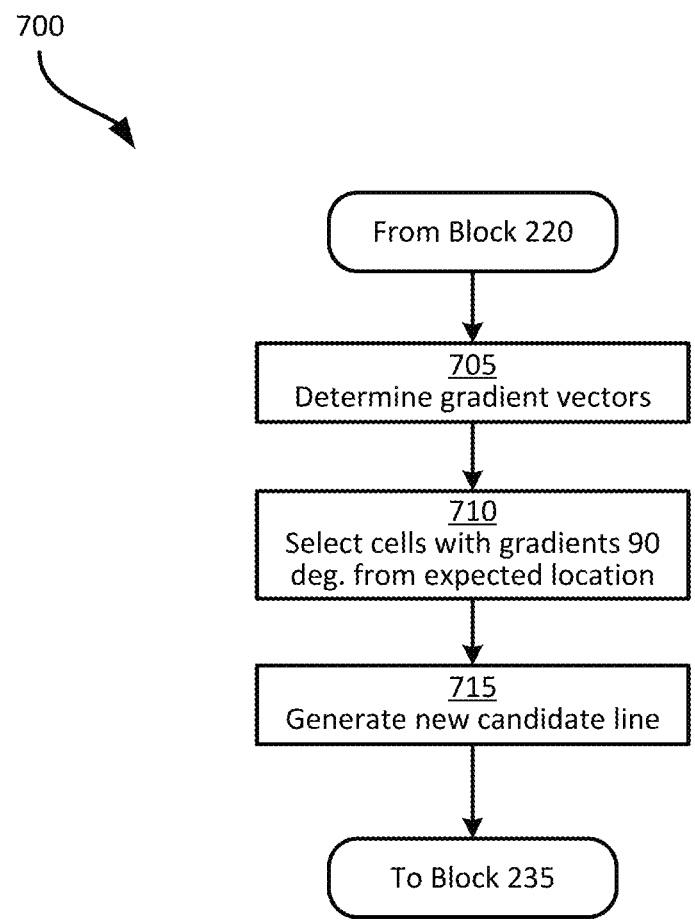
FIG. 7 is a flowchart illustrating another method of performing blocks 225 and 230 of the method of FIG. 2.

Turning to FIG. 7, a method 700 of performing blocks 225 and 230 of the method 200 according to another example implementation is illustrated. The method 700 can be performed by the transporter 128, for example, when the 2D image generated at block 215 is the histogram 420 as discussed above.

Figure 8:
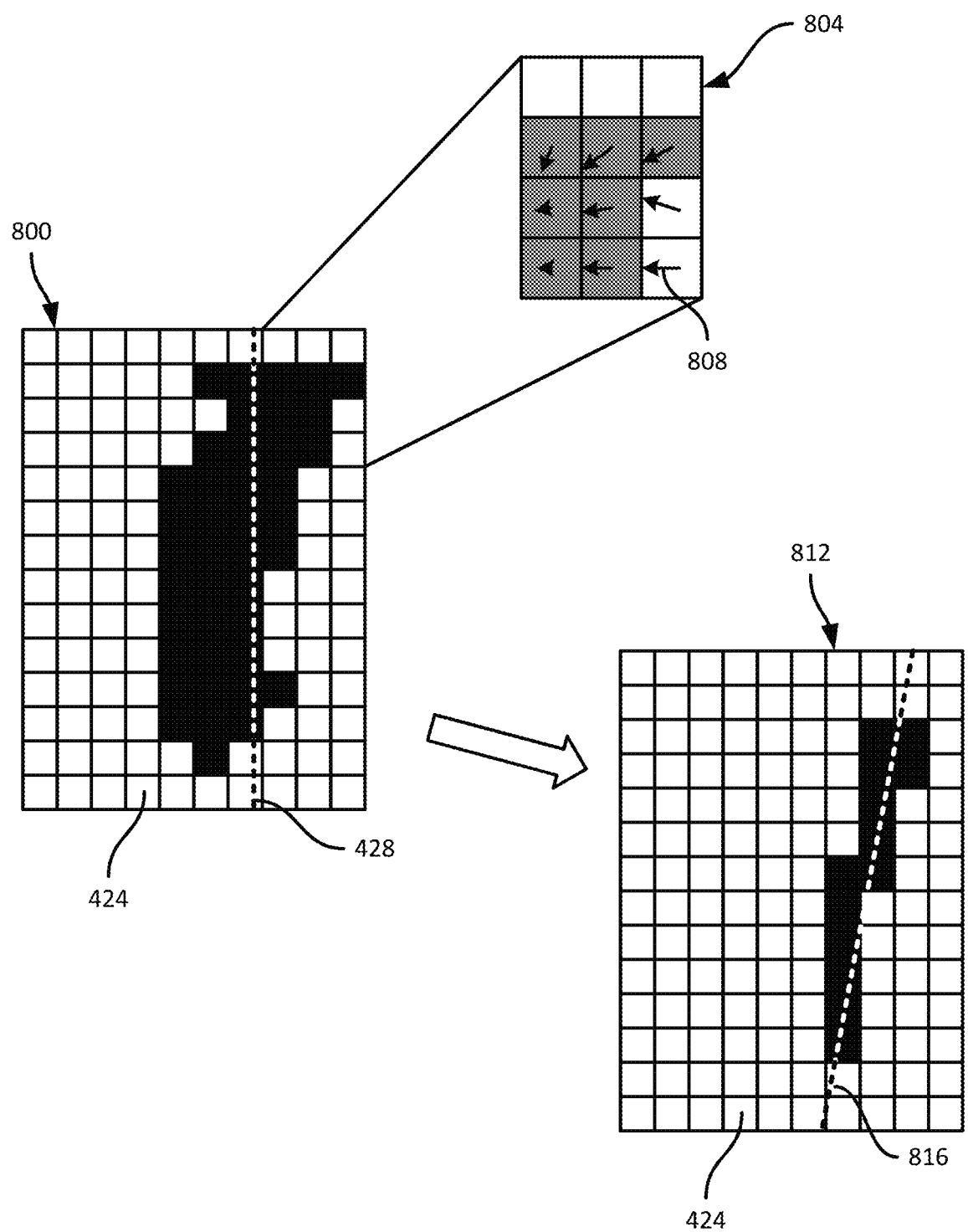
FIG. 8 is a diagram illustrating an example performance of the method of FIG. 7.

At block 705, the transporter 128 is configured to determine a gradient vector for each cell 424. FIG. 8 illustrates an example in which a histogram 800 has been generated from the histogram 420, by applying a binary threshold and morphological operation as mentioned earlier. The inset 804 illustrates a subset of cells 424 with gradient vectors 808 calculated therefor, for example using a 3×3 convolution filter to generate each gradient vector 808. Each gradient 808 indicates a direction, from the center of a cell 424, of an increase in intensity, and a magnitude of the increase (thus, dark cells surrounded by other dark cells exhibit low magnitudes, while light cells bordering dark cells exhibit high magnitudes).

At block 710, the transporter 128 is configured to select cells 424 with gradients that are substantially perpendicular in direction to either the expected location 428 of the forward plane 148, or to the current orientation of the transporter 128. As shown in FIG. 8, the transporter 128 can therefore select a subset 812 of cells 424 satisfying the above criteria. In some examples, the selected cells 424 are those that satisfy the orientation criterion above, and also have a magnitude exceeding a threshold.

At block 715, the transporter 128 is configured to generate a new candidate line corresponding to a location of the forward plane 148, based on the selected subset of cells 424 from block 710. The candidate line can be generated by any suitable line fitting operation, including an iterative operation, such as RANSAC (e.g., which may discard outliers more effectively than non-iterative line-fitting operations). FIG. 8 illustrates a new candidate line 816 indicating the actual location of the forward plane 148, as obtained at block 715. The transporter 128 then returns to block 235.

Referring again to FIG. 2, at block 235 the transporter 128 is configured to provide the actual location of the forward plane 148 to a navigational controller. For example, when navigational control and support structure detection are both performed locally at the transporter 128, at block 235 a detection routine executing at the processor 150 can return the actual location from block 230 to a navigational routine also executing at the processor 150. In other examples, e.g., when navigational computations are performed by a distinct computing device, the transporter 128 can transmit the actual location to the other computing device.

The actual location of the forward plane 148, e.g., expressed as a pair of coordinate sets (e.g., a pair of [X,Y] sets in the coordinate system 136), can be used as input to a localization filter (e.g., a Kalman filter, a Monte Carlo Localization, or MCL filter, or the like). In other examples, the navigational controller can implement a combination of global localization, e.g., for travel along the length of an aisle 112, and local localization, e.g., to maintain a distance from a support structure 104 within the aisle 112.

Variations to the implementations discussed above are also contemplated. For example, the transporter can be configured to perform a plurality of instances of blocks 505 and 510 in parallel, e.g., by generating offset versions of the expected location 428. For example, the transporter 128 can generate a predetermined number of offset expected locations, e.g., with distinct combinations of angular and distance offsets from the expected location 428. Block 510 can then be performed for each offset expected location. At block 515, the transporter 128 can not only determine whether to perform a further iteration for each candidate, but can also discard candidates that do not meet a score threshold.

In further examples, the transporter 128 can capture more than one frame of point cloud data at block 210, prior to performing block 215. For example, the transporter 128 can accumulate a predetermined number of point clouds, e.g., in response to travelling a threshold distance (e.g., 1 m) between each point cloud capture. The point clouds can then be registered to the same frame of reference, and a composite image can be generated therefrom at block 215. The use of multiple frames may provide additional data from which to detect the forward plane 148 of a support structure 104, and may also compensate for optical artifacts, such as distortion introduced by the lens assembly of the sensor 166.

Figure 9:
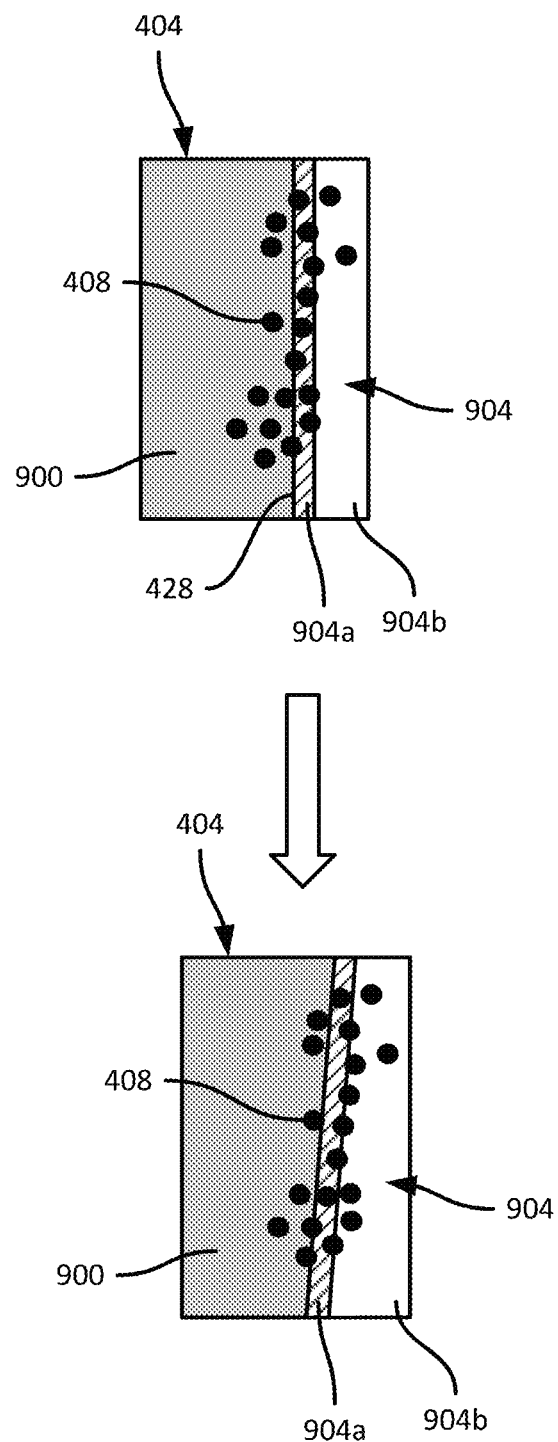
FIG. 9 is a diagram illustrating a further mechanism for support structure detection.

In further examples, as illustrated in FIG. 9, the transporter 128 can maintain an aisle template indicating, for any given aisle 112, regions of the aisle (e.g., in the coordinate system 136) expected to be empty, and regions of the aisle 112 expected to be occupied, e.g., by support structures 104. Following block 215, the transporter 128 can retrieve not only the expected location of a forward plane 148, but also an aisle template, and overlay the template on the 2D image. As shown in FIG. 9, the template indicates a region 900 expected to be occupied, and a region 904 expected to be empty space. The region 904 can be further divided into subregions 904*a* adjacent to the edge 120 of the support structure 104, and a region 904*b* corresponding to the center of the aisle 112.

The transporter 128 can then at block 230, determine an actual location of the forward plane 148 by iteratively adjusting an orientation of the template (i.e., of the regions 900 and 904) and generating a score at each iteration. For example, pixels falling within the region 900 can be assigned a first score (e.g., five points, or any other suitable scoring metric), while pixels falling within the region 904*a* can be assigned a second score (e.g., a penalty of ten points, as the region 904*a* is expected to be clear) and pixels falling within the region 904*b* can be assigned a third score (e.g., two points). The transporter 128 is therefore configured to determine a total score for the image 404, and to iteratively adjust the position of the template to maximize the score. For example, as shown in the lower portion of FIG. 9, the template has been rotated, and in the illustrated position will yield a higher score than the initial iteration, as fewer points lie within the penalized region 904*a*. Further iterations can lead to higher scores, and the final position of the template indicates the actual location of the forward plane 148.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   capturing, via a sensor of a mobile automation apparatus, three-dimensional point cloud data depicting a portion of an aisle containing a support structure, the support structure having a forward plane facing into the aisle;
   generating, from the point cloud data, a two-dimensional projection in a facility coordinate system;
   retrieving, from a stored map, an expected location of the forward plane of the support structure in the facility coordinate system;
   selecting, from the projection, a subset of regions satisfying a positional criterion relative to the expected location of the forward plane;

determining, based on the selected subset of regions from the projection, an actual location of the forward plane of the support structure in the facility coordinate system; and providing the actual location of the forward plane to a navigational controller of the mobile automation apparatus.

2. The method of claim 1, further comprising:

monitoring a pose of the mobile automation apparatus in the facility coordinate system; and prior to generating the projection, comparing the pose to the map to determine that the pose is within an aisle containing the support structure.

3. The method of claim 1, wherein generating the projection includes projecting the point cloud data to a plane of the facility coordinate system parallel to a floor of the facility.

4. The method of claim 3, wherein the expected location of the forward plane of the support structure is a line coplanar with the projection.

5. The method of claim 1, wherein selecting the subset of regions satisfying the positional criterion includes:

selecting a first subset of pixels within a first threshold distance of the expected location of the forward plane.

6. The method of claim 5, wherein determining the actual location includes:

fitting a first candidate line to the first subset of pixels;

selecting a second subset of pixels within a second threshold distance of the first candidate line; and fitting a second candidate line to the second subset of pixels.

7. The method of claim 6, wherein the second threshold distance is smaller than the first threshold distance.

8. The method of claim 1, wherein generating the projection includes:

generating a two-dimensional grid of cells substantially perpendicular to the forward plane of the support structure;

projecting the point cloud data onto the grid; and assigning a value to each cell according to a count of projected points within the cell.

9. The method of claim 8, wherein generating the projection further includes:

assigning each cell either (i) a first value indicating occupied space, if the count exceeds a threshold, or (ii) a second value indicating empty space, if the count does not exceed the threshold.

10. The method of claim 8, wherein selecting the subset of regions satisfying the positional criterion includes:

determining a gradient vector for each cell; and selecting cells having gradient vectors within an angular threshold of perpendicular to the expected location of the forward plane of the support structure.

11. The method of claim 10, wherein determining the actual location of the forward plane includes fitting a line to the selected cells.

12. A computing device, comprising:

a sensor;

a processor configured to:

capture, via the sensor, three-dimensional point cloud data depicting a portion of an aisle containing a support structure, the support structure having a forward plane facing into the aisle;

generate, from the point cloud data, a two-dimensional projection in a facility coordinate system;

retrieve, from a stored map, an expected location of the forward plane of the support structure in the facility coordinate system;

select, from the projection, a subset of regions satisfying a positional criterion relative to the expected location of the forward plane;

determine, based on the selected subset of regions from the projection, an actual location of the forward plane of the support structure in the facility coordinate system; and provide the actual location of the forward plane to a navigational controller of a mobile automation apparatus.

13. The computing device of claim 12, wherein the processor is further configured to:

monitor a pose of the mobile automation apparatus in the facility coordinate system; and prior to generating the projection, compare the pose to the map to determine that the pose is within an aisle containing the support structure.

14. The computing device of claim 12, wherein the processor is configured to generate the projection by projecting the point cloud data to a plane of the facility coordinate system parallel to a floor of the facility.

15. The computing device of claim 14, wherein the expected location of the forward plane of the support structure is a line coplanar with the projection.

16. The computing device of claim 12, wherein the processor is configured to select the subset of regions satisfying the positional criterion by:

selecting a first subset of pixels within a first threshold distance of the expected location of the forward plane.

17. The computing device of claim 16, wherein the processor is configured to determine the actual location by:

fitting a first candidate line to the first subset of pixels;

selecting a second subset of pixels within a second threshold distance of the first candidate line; and fitting a second candidate line to the second subset of pixels.

18. The computing device of claim 17, wherein the second threshold distance is smaller than the first threshold distance.

19. The computing device of claim 12, wherein the processor is configured to generate the projection by:

generating a two-dimensional grid of cells substantially perpendicular to the forward plane of the support structure;

projecting the point cloud data onto the grid; and assigning a value to each cell according to a count of projected points within the cell.

20. The computing device of claim 19, wherein the processor is further configured to generate the projection by:

assigning each cell either (i) a first value indicating occupied space, if the count exceeds a threshold, or (ii) a second value indicating empty space, if the count does not exceed the threshold.

21. The computing device of claim 19, wherein the processor is configured to select the subset of regions satisfying the positional criterion by:

determining a gradient vector for each cell; and selecting cells having gradient vectors within an angular threshold of perpendicular to the expected location of the forward plane of the support structure.

22. The computing device of claim 21, wherein the processor is configured to determine the actual location of the forward plane by fitting a line to the selected cells.

* * * * *